US011535322B2

(12) United States Patent
Rawas et al.

(10) Patent No.: US 11,535,322 B2
(45) Date of Patent: Dec. 27, 2022

(54) OMNI-POSITIONAL ADHESION DEVICE

(71) Applicant: DIVERGENT TECHNOLOGIES, INC., Los Angeles, CA (US)

(72) Inventors: Oussama Rawas, Los Angeles, CA (US); Finley Hugh Marbury, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 229 days.

(21) Appl. No.: 16/800,940

(22) Filed: Feb. 25, 2020

(65) Prior Publication Data

US 2021/0261210 A1    Aug. 26, 2021

(51) Int. Cl.
*B23P 19/00* (2006.01)
*B62D 65/02* (2006.01)
(Continued)

(52) U.S. Cl.
CPC .............. *B62D 65/026* (2013.01); *B23Q 3/18* (2013.01); *B25B 11/00* (2013.01); *B25B 11/02* (2013.01); *B62D 65/00* (2013.01); *B33Y 80/00* (2014.12)

(58) Field of Classification Search
CPC ........... B25B 11/00; B25B 11/02; B23Q 3/00; B23Q 3/18; B62D 65/00
See application file for complete search history.

(56) References Cited

U.S. PATENT DOCUMENTS

| 4,033,484 A | * | 7/1977 | Ornsteen | ........... B05C 17/00533 222/391 |
| 4,974,752 A | * | 12/1990 | Sirek | ................. B05C 17/00533 222/391 |

(Continued)

FOREIGN PATENT DOCUMENTS

| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Lee D Wilson
(74) *Attorney, Agent, or Firm* — ArentFox Schiff LLP (57) ABSTRACT

Aspects are provided for retaining components of an assembly to a support, including additively manufactured (AM) parts of a vehicle chassis to an assembly table. A cartridge for securing the component to the assembly table is provided which includes a housing including at least one compartment, an adhesive disposed within the at least one compartment, a fastener removably attached to the assembly table, and a membrane lid enclosing an opening of the housing. The membrane lid is configured to receive a protruding member from the component such that the protruding member becomes adhered to the adhesive upon penetrating the membrane lid. The cartridge thus allows the component to be quickly retained in any selected position while constraining movement of the component along six degrees of freedom, thereby allowing AM and non-AM parts to be securely retained to accommodate strict tolerance and precise fit between the components of the assembly.

23 Claims, 6 Drawing Sheets

(51) Int. Cl.
  *B23Q 3/18*  (2006.01)
  *B25B 11/00* (2006.01)
  *B62D 65/00* (2006.01)
  *B25B 11/02* (2006.01)
  *B33Y 80/00* (2015.01)

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |

(56) References Cited

U.S. PATENT DOCUMENTS

| | | |
|---|---|---|
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |

(56) References Cited

U.S. PATENT DOCUMENTS

| | | |
|---|---|---|
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0341309 A1 | 11/2017 | Piepenbrock et al. |
| 2021/0261210 A1* | 8/2021 | Rawas .................. B25B 11/02 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

OMNI-POSITIONAL ADHESION DEVICE

BACKGROUND

Field

The present disclosure relates generally to retention of assemblies, sub-assemblies, or parts during manufacture, and more specifically to retention of components of an additively manufactured vehicle chassis during assembly of the vehicle chassis.

Background

Additive manufacturing (AM) has provided a significant evolutionary step in the development and manufacture of vehicles and other transport structures. For nearly a century prior to the introduction of AM, manufacturers have been relegated to the assembly line technique of vehicle production using conventional machining to construct and assemble vehicle parts. Because the machined parts are generally specific to a vehicle model design, and as acquiring new tooling to construct modified parts can be cost prohibitive, manufacturers have had limited flexibility to implement modifications to an established vehicle design. As a result, a manufacturing facility often uses assembly lines that are limited to producing a single vehicle model.

Being non-design specific, AM is capable of enabling construction of an almost unlimited variety of structures having diverse geometrical shapes and material characteristics. Different AM printers can provide these structures using a variety of materials, including metals, alloys and thermoplastics. In a new infrastructure hereinbefore proposed by Applicant, AM becomes a primary means of developing custom parts. Parts made via traditional machining and casting, together with widely available commercial off-the-shelf (COTS) parts, can be linked together in a modular form via these custom AM structures to form a chassis of a vehicle, fuselage of an aircraft, body of a sea vessel, and the like. AM modular parts can also be printed that form the interior of the transport structure. Design modifications are straightforward and can be effected by printing modified AM structures, which avoids the expense of acquiring new tooling.

SUMMARY

Several aspects will be described more fully hereinafter with reference to various illustrative aspects of the present disclosure.

In one aspect of the disclosure, a cartridge for securing a component of an assembly to a support (e.g. an assembly table) is provided. The cartridge includes a housing including at least one compartment, an adhesive disposed within the at least one compartment, a fastener connected to the housing and removably attached to the assembly table, and a membrane lid enclosing an opening of the housing. The membrane lid is configured to receive a protruding member from the component such that the protruding member becomes adhered to the adhesive upon penetrating the membrane lid.

In another aspect of the disclosure, a vehicle chassis assembly is provided which includes a chassis comprising a plurality of components, each component of the plurality of components including a protruding member, and a plurality of cartridges for individually securing each component to an assembly table. Each cartridge includes a housing including at least one compartment, an adhesive disposed within the at least one compartment, a fastener connected to the housing and removably attached to the assembly table, and a membrane lid enclosing an opening of the housing. The membrane lid is configured to receive a protruding member from the component such that the protruding member becomes adhered to the adhesive upon penetrating the membrane lid.

In a further aspect of the disclosure, a method of securing a component of an assembly to an assembly table is provided. A cartridge is attached to the assembly table, where the cartridge includes a housing including at least one compartment, an adhesive disposed within the at least one compartment, a membrane lid enclosing an opening of the housing, and a fastener connected to the housing for removable attachment to the assembly table. A protruding member of the component is inserted into the cartridge, and the protruding member is retained in the cartridge using the adhesive.

It will be understood that other aspects of the disclosure will become readily apparent to those skilled in the art based on the following detailed description, wherein they are shown and described in only several embodiments by way of illustration. As will be appreciated by those skilled in the art, these features, structures, methods and techniques can be realized with other embodiments without departing from the spirit and scope of the invention. Accordingly, the drawings and detailed description are to be regarded as illustrative in nature and not as restrictive.

BRIEF DESCRIPTION OF THE DRAWINGS

Various illustrations of aspects of the present disclosure will now be presented in the detailed description by way of example, and not by way of limitation, in the accompanying drawings, wherein.

DETAILED DESCRIPTION

The detailed description set forth below in connection with the drawings is intended to provide a description of exemplary embodiments of the present invention. The description is not intended to represent the only embodiments in which the invention may be practiced. The terms "exemplary" and "example" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or may be shown not drawn to scale, or omitted entirely, in order to avoid obscuring the various concepts presented throughout this disclosure.

In manufacturing assemblies that include AM structures, individual AM structures will often need to be connected together, or connected to machined or COTS parts, to provide combined structures, e.g., to realize the above modular network or to form a complex interior assembly in a vehicle. Examples include node-to-node connections, node-to-panel connections, node-to-tube connections, and node-extrusion connections, among others. For connecting these parts, a strict tolerance is often required, meaning that the parts must be positioned to fit precisely in an established orientation. For example, to connect an AM joint member with a vehicle body panel, these two parts may need to be positioned to avoid direct contact with each other in order to mitigate possible galvanic corrosion problems. Moreover, the connection between the AM joint member and panel should result in an accurate fit. Thus, the AM joint member should not be misaligned with or offset from the body panel, for example, and the parts should remain properly oriented when permanently bonded together.

Given these requirements for strict tolerance, proper orientation and precise fit when connecting AM and/or non-AM parts or components, a need exists to securely retain these components in their selected positions to prevent their movement during assembly. Aspects of the present disclosure provided hereinafter are disclosed which meet this need.

The present disclosure is directed to apparatus, systems, and methods for retaining components of an assembly to a support. For example, the assembly may comprise a frame of a vehicle, and the component may comprise a part, sub-assembly, or assembly of the frame. Examples of a frame of a vehicle may include, but are not limited to, a chassis, a space frame, a three-dimensional frame, an internal frame, an outer frame, a partially inner and partially outer frame, or a supporting structure of the vehicle. Examples of a component of the frame may include, but are not limited to, a part such as a node, tube, panel, or extrusion; a sub-assembly including one or more node-to-node connections, node-to-panel connections, node-to-tube connections, and node-extrusion connections; a plurality of sub-assemblies; or an assembly of the frame. While the aforementioned examples describe assemblies and components of a vehicle, the present disclosure is not limited to vehicles, but may encompass assemblies and components of any article of manufacture (e.g. consumer electronics devices). The components may encompass 3D-printed AM parts, sub-assemblies, or assemblies, conventionally manufactured non-AM parts, sub-assemblies, or assemblies, COTS parts, or a combination of AM, non-AM, and/or COTS parts, sub-assemblies, or assemblies. Examples of a support for the assembly may include, but are not limited to, an assembly table, a wall, a platform, and the like.

In one aspect, the assembly may be performed in a manufacturing cell. The assembly may be manually performed by workers, or the assembly may be automatically performed using one or more assembly robots. For example, the manufacturing cell may be a vertical assembly cell which includes a positioner, a robot carrier, and an assembly robot. In the vertical assembly cell, the positioner may be configured to receive an assembly table, where the assembly table is configured to hold the assembly (e.g. a frame of a vehicle). The robot may be mounted on the robot carrier and is configured to assemble the frame. The positioner may be configured to support the frame in a vertical position during an assembling process of the frame. Alternatively, the manufacturing cell may not be a vertical assembly cell, but may generally be any environment in which the assembly is manufactured. For example, the positioner may be configured to only support the frame in a horizontal position, or the positioner may not be present and the fixture table is horizontally mounted in the manufacturing cell. The manufacturing cell may thus not be limited to a vertical assembly cell.

In one aspect of the present disclosure, a component (e.g. a part) of the assembly (e.g. a vehicle chassis) is retained to the support (e.g. an assembly table) using an Omni-Positional Adhesion Device (OPAD). The OPAD comprises a cartridge including a housing including at least one compartment, an adhesive disposed in the compartment, a fastener connected to the housing and a penetrable membrane lid enclosing the housing. In one aspect, the housing includes two compartments together containing two parts of a low-viscosity, quick set adhesive (e.g. a resin and a hardener), and a breakable or displaceable divider separating the two compartments for mixing the parts of the adhesive. Alternatively, the housing may include a single compartment containing the adhesive, or any number of compartments containing multiple parts of the adhesive and/or the adhesives.

Each component of the assembly may include a feature capable of being received in and retained by the cartridge. In one aspect, the component may have a feature protruding from the component which may be inserted into the cartridge to retain the component in a selected position. This protruding member may be integral with the component, for example, it may be 3D printed to a node or other AM part. Alternatively, the protruding member may be a printed, fabricated, or otherwise manufactured feature which is separately attached, fastened, adhered or otherwise connected to the component.

In one aspect, the membrane lid of the cartridge receives the protruding member of the component to retain the component to the assembly table. For example, the protruding member may be a rod, pin, or piston of a 3D printed node of a vehicle chassis which may break through the membrane lid into the adhesive contained within the compartment(s). Where the cartridge includes two compartments of a two part adhesive as previously described, the protruding member in this aspect may break or displace the divider between the two adhesive compartments after penetrating the membrane lid, causing rapid mixing of the two parts and adhesion of the component to the cartridge. The component may thus be securely retained in a selected position during assembly of the chassis once the fastener connected to the housing of the cartridge is attached to the support.

As a result, the cartridge allows the component of the assembly to be quickly retained in any selected position (e.g. within 2 minutes), while constraining movement of the component along six degrees of freedom. More specifically, the cartridge of the present disclosure allows the component to be restricted from translating in three perpendicular axes x, y, z (e.g. moving forward/backward, up/down, and left/right), and from rotating about the three axes x, y, z (e.g. undergoing yaw, pitch, and roll), allowing the components to maintain their position, alignment, and/or fit during assembly without the need for numerous vises, clamps, or other expensive retention mechanisms. The present disclosure thus advantageously allows AM and non-AM parts to be securely retained during assembly in a selected position to accommodate strict tolerance and accurate and precise fit between the various components of the assembly.

The cartridge also provides other advantages. For instance, the cartridge has a small form factor which enables it to be strategically and independently placed to securely hold numerous components of the assembly (e.g. in the order of tens or hundreds or even thousands of cartridges per assembly). The cartridges may also be 3D printed with plastic or metal components, are disposable after use and serve as a cost-effective retention mechanism for components of the assembly, in contrast to conventionally used vises which can be expensive, unwieldy, and time-consuming to develop for an assembly. Moreover, the cartridge is flexibly designed; it can be placed, oriented, and/or sized depending on its use (e.g. larger for heavier components). The cartridge is also self-contained, thereby allowing it to be oriented as needed with limited to no spilling of the adhesive.

Figure 1:
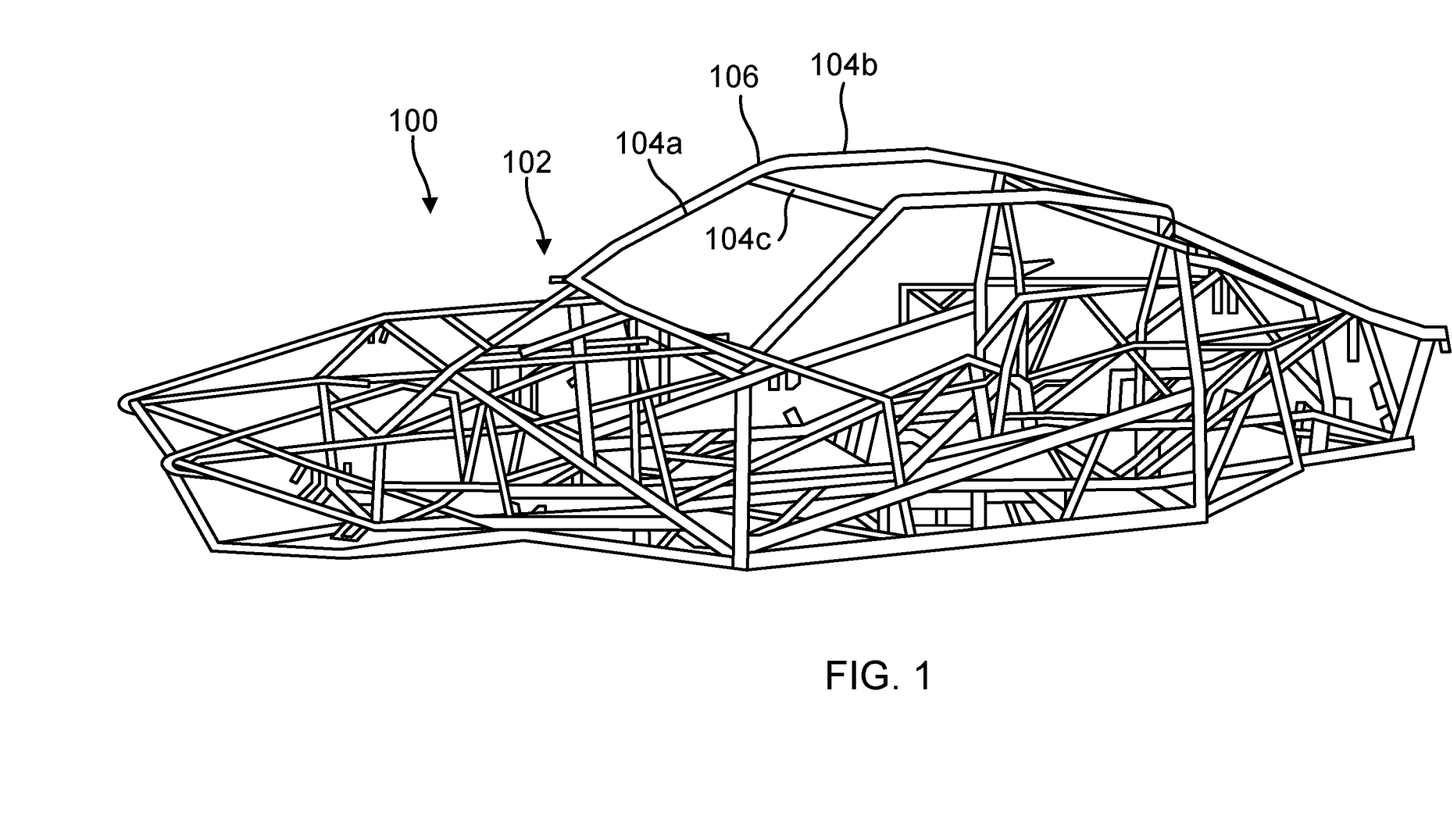
FIG. 1 is a schematic of a frame or chassis of a vehicle and serving as an example of an assembly having multiple components.

FIG. 1 illustrates an example of an assembly 100. While FIG. 1 illustrates the assembly as a frame 102 of a vehicle, the assembly 100 is not limited to a vehicle, but may alternatively be any article of manufacture which may be assembled (e.g. a consumer electronics device). For purposes of the present disclosure, an example assembly 100 will be hereafter described in the context of a frame 102 or chassis of a vehicle. However, this description is not intending to be limiting; various aspects hereinafter described may be used for assemblies 100 which may not necessarily be a frame of a vehicle. For example, the assembly 100 may encompass other types of frames or structures having components such as nodes, tubes, panels, extrusions, or sub-assemblies of the foregoing, for use in various applications besides vehicles (e.g. consumer electronics).

The frame 102 (e.g. assembly 100) may include a plurality of connecting elements 104a, 104b, 104c, and a plurality of joint members or nodes 106. For example, the joint members or nodes may be produced by a 3-D printer. Each joint member may be sized and shaped to mate with at least a subset of the plurality of the connecting elements 104a, 104b, 104c to form a three-dimensional frame structure 102. The plurality of joint members 106 include mounting features, which provide panel mounts for mounting of panels on the three-dimensional frame structure 102. For example, the mounting features may be produced by a 3-D printer.

In one example, the frame 102 may form the framework of a vehicle. The vehicle may be a passenger vehicle capable of carrying at least one or more passengers, examples of which may include, but are not limited to sedans, trucks, buses, vans, minivans, station wagons, RVs, trailers, tractors, go-carts, automobiles, trains, or motorcycles, boats, spacecraft, or airplanes. The frame 102 may provide the structure for placement of body panels of the vehicle, where body panels may be door panels, roof panels, floor panels, or any other panels forming the vehicle enclosure. Furthermore, the frame 102 may be the structural support for the wheels, drive train, engine block, electrical components, heating and cooling systems, seats, storage space, and other systems.

Figure 2:
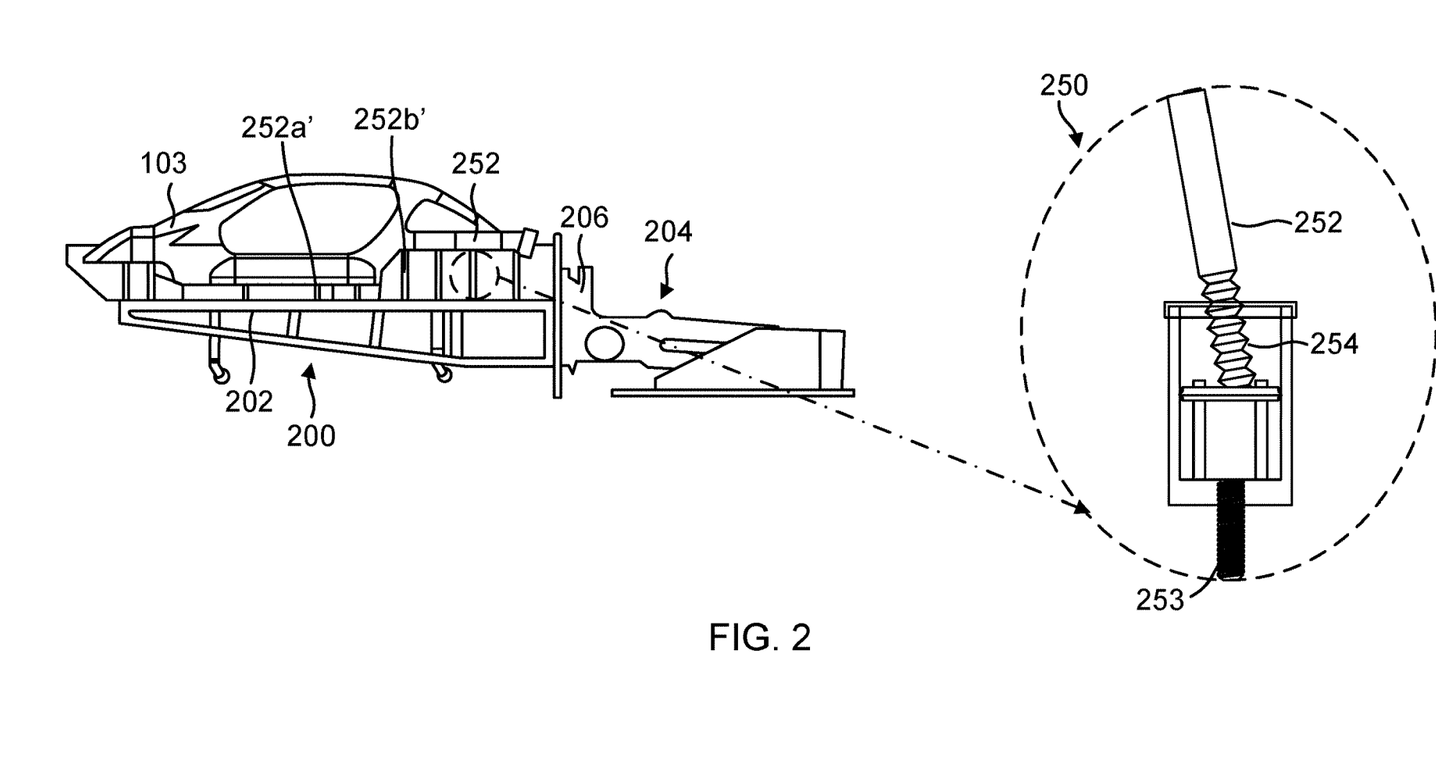
FIG. 2 is a schematic of an assembly table and serving as an example of a support to which a component of the assembly of FIG. 1 is secured by a cartridge in accordance with one aspect of the present disclosure.

FIG. 2 is an illustration of a support 200 configured to support and hold the assembly 100. For example, the support 200 may be an assembly table 202, and the assembly 100 may be a frame 102 of a vehicle. In one aspect, the assembly table 202 may be contained within a vertical assembly cell (not shown), in which the assembly table 202 is coupled to a positioner 204 configured to hold the frame 102 in a vertical position during assembly. The positioner 204 may be configured to support the assembly table 202 and to perform one or more of lifting, tilting, and rotating the assembly table 202. The positioner 204 may also include a 3-point kinematic mount 206 through which the assembly table 202 may be secured to the positioner 204. Alternatively, the support 200 may not be contained within a vertical assembly cell; for example, the assembly 100 may be held in a horizontal position to the assembly table 202 (e.g. by clamps), with or without positioner 204. For purposes of the present disclosure, the support 200 will be hereafter described in the context of an assembly table 202 contained within a vertical assembly cell for supporting a frame 102 (FIG. 1) of a vehicle. However, this description is not intending to be limiting; various aspects hereinafter described may be present in assembly locations which are not vertical assembly cells, and the assembly may not necessarily be a frame of a vehicle.

According to an aspect of the present disclosure, a cartridge 250 is provided which may securely retain a component 252 of assembly 100 to the support 200. For example, individual cartridges 250 may retain connecting elements 104a, 104b, 104c and/or nodes 106 (e.g. components 252) of the chassis or frame 102 to assembly table 202. Each cartridge 250 may include a fastener 253 (e.g. a screw, bolt, or any other removable, mechanical fastening member) which may be removably attached to the assembly table 202. Thus, fastener 253 may serve as a chassis table attachment in one example for the component.

In one aspect, each component 252 of the assembly 100 may have an integrally or separately attached protruding member 254 which is used to retain the component inside the cartridge 250. For example, FIG. 2 illustrates a component 252 (e.g. a connecting element) of chassis/frame 102 which includes a protruding member 254 which is received and retained inside cartridge 250 via an adhesive bond. Using fastener 253, cartridge 250 may securely retain component 252 to the assembly table 202 in a selected position during assembly of frame 102.

Other components 252, e.g. parts, sub-assemblies, or assemblies of chassis or frame 102, may be similarly retained to support 200 by individual cartridges 250 depending on load requirements. For example, components 252a', 252b' (e.g. connecting elements 104a, 104b, 104c and/or nodes 106) may each include a protruding member 254 which may be received and retained inside respective cartridges fastened to the assembly table 202. Thus, a plurality of cartridges 250 may securely retain components 252 of the assembly 100 to the assembly table 202 in selected positions during assembly of frame 102.

Figure 3A:
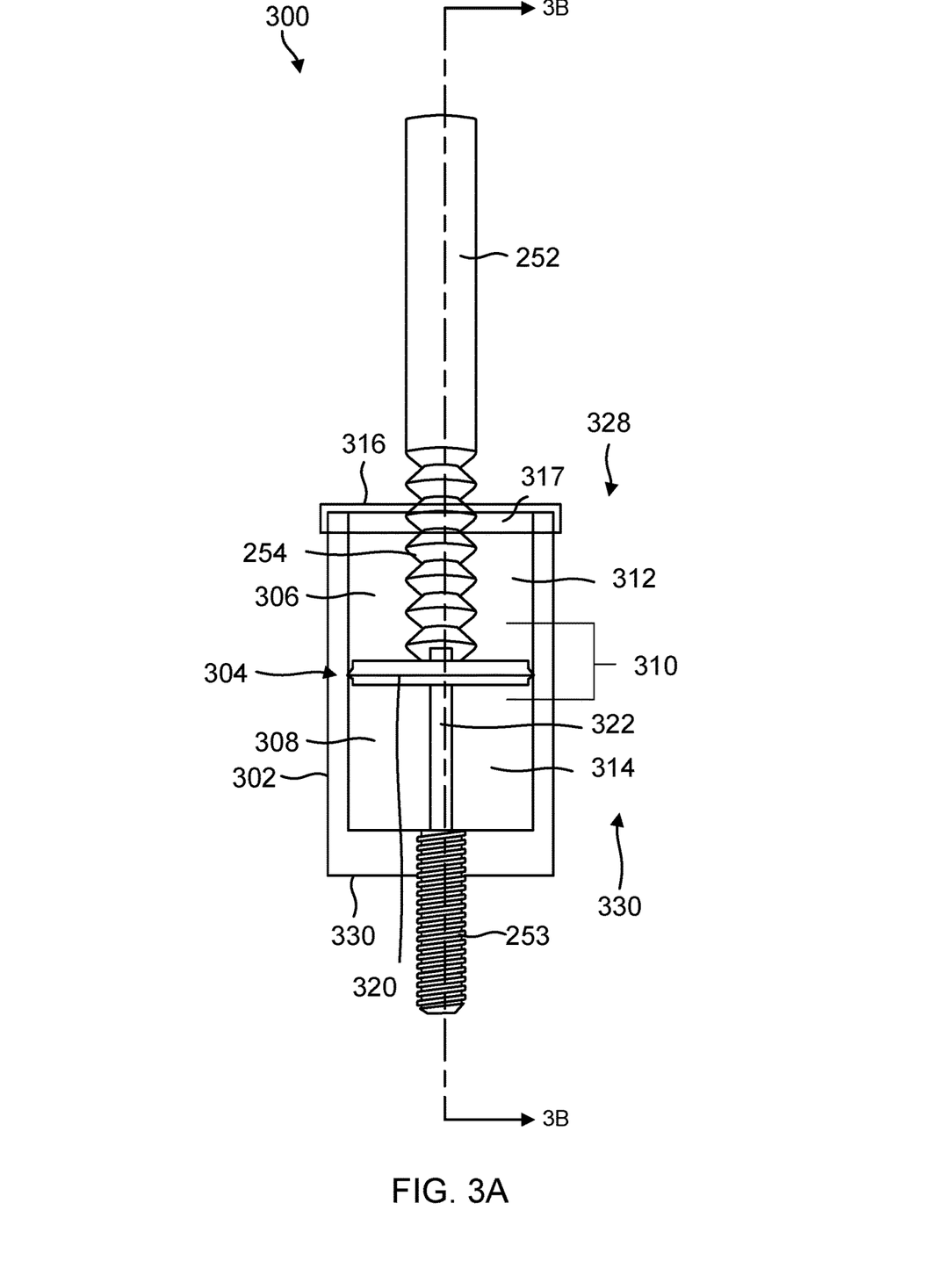
FIG. 3A is a schematic of the cartridge for securing the component of the assembly to the support as illustrated in FIG. 2.
Figure 3B:
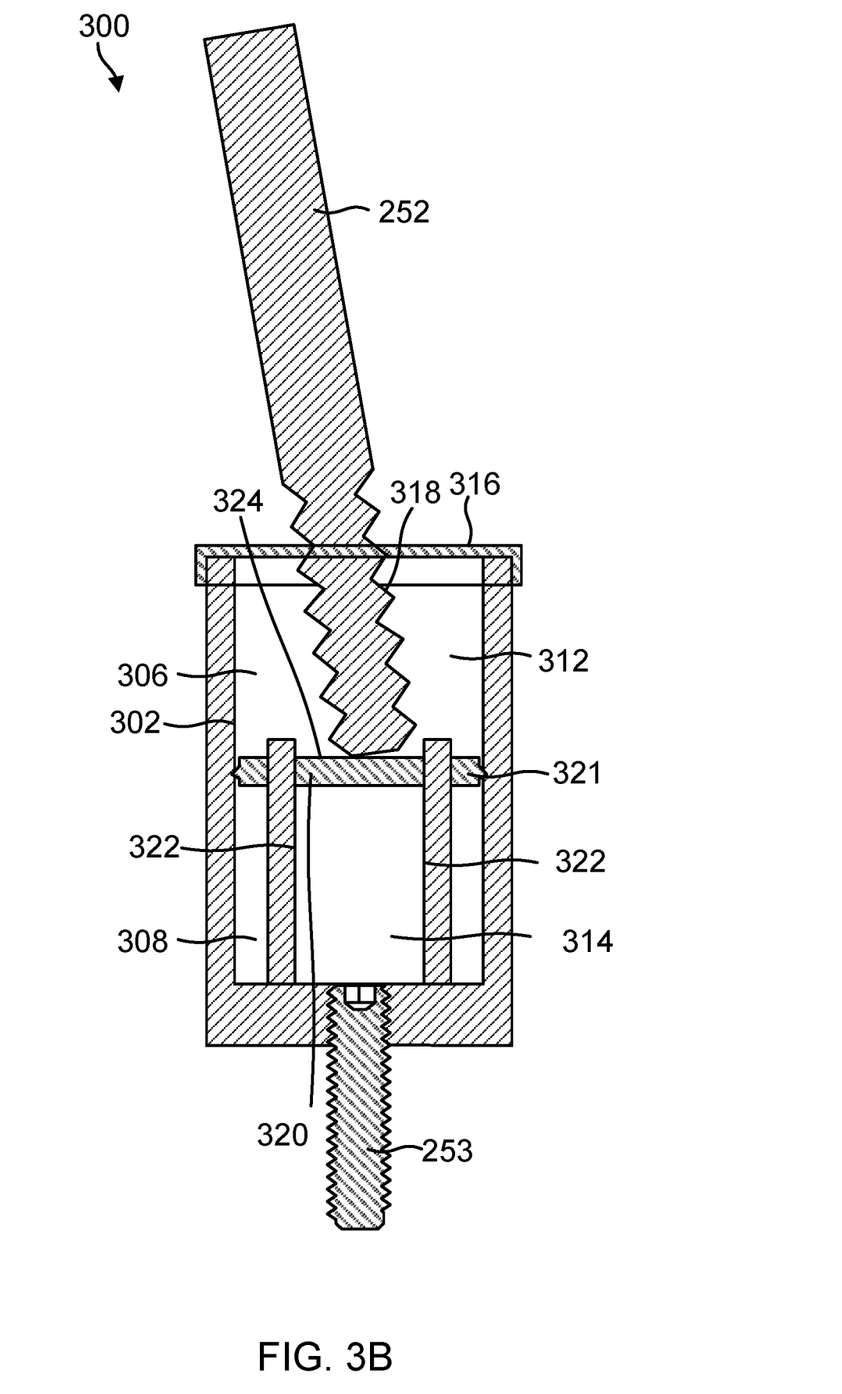
FIG. 3B is a cross-sectional side view of the cartridge of FIG. 3A.
Figure 3C:
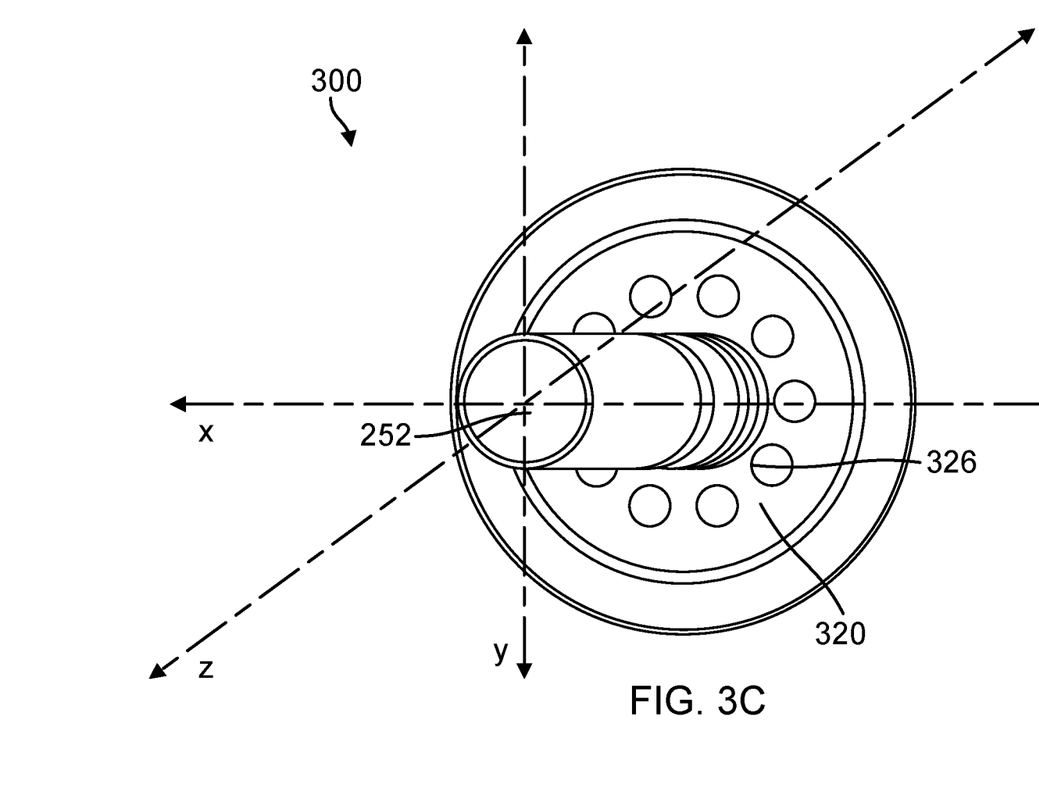
FIG. 3C is a top perspective view of the cartridge of FIG. 3A.

FIGS. 3A-3C illustrate an example of cartridge 300 (e.g. cartridge 250) according to an aspect of the present disclosure. Each cartridge 300 includes a housing 302 including at least one compartment 304. In one aspect, the housing may include multiple compartments, for example a first compartment 306 and a second compartment 308. The compartments may be vertically arranged as illustrated in FIG. 3B, may be horizontally arranged, or may be arranged in other orientations. The compartments may be equivalent in size as illustrated in FIG. 3B, or may include different sizes.

An adhesive 310 is disposed within the compartment which adheres the protruding member to the cartridge. For example, the adhesive may be a two part adhesive including a resin 312 and a hardener 314. The resin 312 may be disposed in the first compartment, and the hardener 314 may be disposed in the second compartment, or vice-versa. The adhesive 310 is preferably a low-viscosity, quick set adhesive which allows the resin and hardener to mix and quickly allow the component 252 to adhere to the cartridge 250.

The housing 302 includes a membrane lid 316 enclosing an opening 317 of the housing. The membrane lid may prevent the adhesive 310 from spilling and may isolate the at least one compartment 304 from the environment, including elements such as rain or wind. The membrane lid 316 is configured to receive the protruding member 254 from the component 252 such that the protruding member becomes adhered to the adhesive 310 upon penetrating the membrane lid. For example, the membrane lid 316 may be easily punctured when the protruding member 254 applies a force to the membrane lid 316, allowing the protruding member to penetrate the membrane lid 316 into the at least one compartment 304 and become adhered to the adhesive 310 disposed within the compartment.

In an exemplary embodiment, the membrane lid 316 initially prevents the adhesive 310 from spilling out the at least one compartment 304. For example, if the cartridge 300 is rotated, the adhesive and/or resin 312 and hardener 314 may be contained by the membrane lid. However, once the protruding member 254 of the component 252 breaks the seal caused by the membrane lid, the membrane lid 316 may no longer be able to independently prevent the adhesive from spilling from the compartment upon rotation of the cartridge. To resolve this problem, in one example, the protruding member 254 may include saw-tooth edges 318 (FIG. 3B) configured to grip and form a seal against the membrane lid after insertion of the protruding member 254 into the at least one compartment 304. For example, after the protruding member penetrates the membrane lid, the saw tooth edges 318 may seal against the membrane lid as illustrated in FIG. 3B such that adhesive is prevented from exiting the compartment upon rotation of the cartridge 300. Since the saw tooth edges 318 of the protruding member 254 have a larger surface area than the smooth surface of the component 252, the protruding member 254 may form a better grip against the surface of the membrane lid 316, and thereby form a more effective seal, than the component 252 may possibly alone. However, this example is not intended to be limiting; for example, the protruding member 254 may have other features besides saw tooth edges configured to seal against the membrane lid for preventing or mitigating the occurrence of leaks.

In an aspect where the housing 302 includes two compartments, a divider 320 may be disposed between and separating the first compartment 306 and the second compartment 308. The divider may form a seal 321 against the housing to prevent the resin 312 and hardener 314 from prematurely mixing through the divider. Moreover, at least one divider guide 322 may be disposed within either or both compartments 306, 308 for holding the divider 320 in place within the housing.

In one aspect, the divider 320 may comprise a film sheathing 324 (FIG. 3B), and the resin 312 and the hardener 314 may be configured to mix upon breakage of the film sheathing by the protruding member 254 of the component 252. For example, the sheathing 324 of the divider 320 may be designed to easily break when the protruding member 254 applies a force to the divider 320, eliminating the barrier between the resin 312 and the hardener 314 and allowing the two-part adhesive to mix. Accordingly, once the divider 320 breaks, the resin and hardener may mix, forming the adhesive 310 which adheres the protruding member 254 to the cartridge 300.

In some aspects, the resin 312 and hardener 314 may mix in response to some agitation caused by the breaking of the divider. In one example, a small compressed air bubble (not shown) may be present in the resin and/or the hardener which may burst in response to puncturing of the divider 320, causing the resin and hardener to mix in response to the release of compressed air. In another example, a loaded mechanical spring (not shown) may be included in either compartment 306, 308 which may be triggered to spin in response to breaking of the divider 320, mixing the resin 312 and the hardener 314 in response to the spinning. In a further example, the divider 320 may be pressurized to allow the resin 312 and the hardener 314 to volatilely mix upon breakage of the divider. For example, the first and second compartments 306, 308 may be sized such that a pressure differential exists between the compartments for the resin 312 and the hardener 314, and when the divider 320 breaks upon insertion of the protruding member 254, a turbulent flow and mixture of the resin and/or hardener may result to obtain equilibrium in pressure, which can in turn facilitate quick bonding of the resulting adhesive mixture with the protruding member 254.

Other mechanisms for agitating the resin and/or hardener to homogenously mix and effectively bind the component 252 to the cartridge 300 are also possible. For instance, where the cartridge only includes one compartment 304, the adhesive 310 may be cured using inductive heating coils disposed around the compartment 304 which may be controllably heated to cure the adhesive within a predetermined time. Conductive metal may be placed inside the adhesive to speed up the heating process. Thus, the adhesive 310 and/or resin 312, hardener 314 may be designed to solidify within a predetermined time (for example, two minutes) to quickly retain the component before moving to the next process of the assembly. This effect may be obtained regardless of the number of compartments in the cartridge.

In an alternative aspect, the divider 320 may not be configured to break, but may instead be configured to displace (or move) to result in mixture of the resin 312 and hardener 314. In one aspect referring additionally to FIG. 3C, the divider 320 may include a plurality of orifices 326, and the resin 312 and the hardener 314 may be configured to mix through the plurality of orifices upon displacement of the divider by the protruding member 254 of the component 252. For example, the divider may be designed to be displaceable, or movable towards either end 328, 330 of the housing 302 (FIG. 3A), in response to a force applied by the protruding member 254 against the divider 320. When the divider 320 is displaced by the protruding member 254, the resulting pressure differential effected by the shrinking in size of either compartment 306, 308 causes the hardener or resin (whichever is contained in the shrinking compartment) to flow through the plurality of orifices 326 towards the other compartment. The displacement thus allows the resin 312 and hardener 314 to mix, forming the adhesive 310 which adheres the protruding member 254 to the cartridge 300.

Therefore, when the protruding member 254 of the component 252 of the assembly 100 is inserted into the at least one compartment 304 of the cartridge 300, the cartridge may constrain the component against movement along six degrees of freedom. For example, after the protruding member penetrates the membrane lid 316 and adheres to compartment 306 or 308, for example after breaking or displacing the divider 320 and mixing resin 312 and hardener 314 to form adhesive 310, the protruding member may be constrained in movement (e.g. translation and rotation) along the three perpendicular axes x, y, and z. The component-cartridge combination may be subsequently attached to the assembly table 202 via fastener 253. Alternatively, the cartridge 300 may be previously attached to the assembly table 202 via fastener 253 prior to insertion of the protruding member 254. Thus, the cartridge allows AM and non-AM parts to be securely retained during assembly in a selected position to accommodate strict tolerance and accurate and precise fit between the various components of the assembly.

Figure 4:
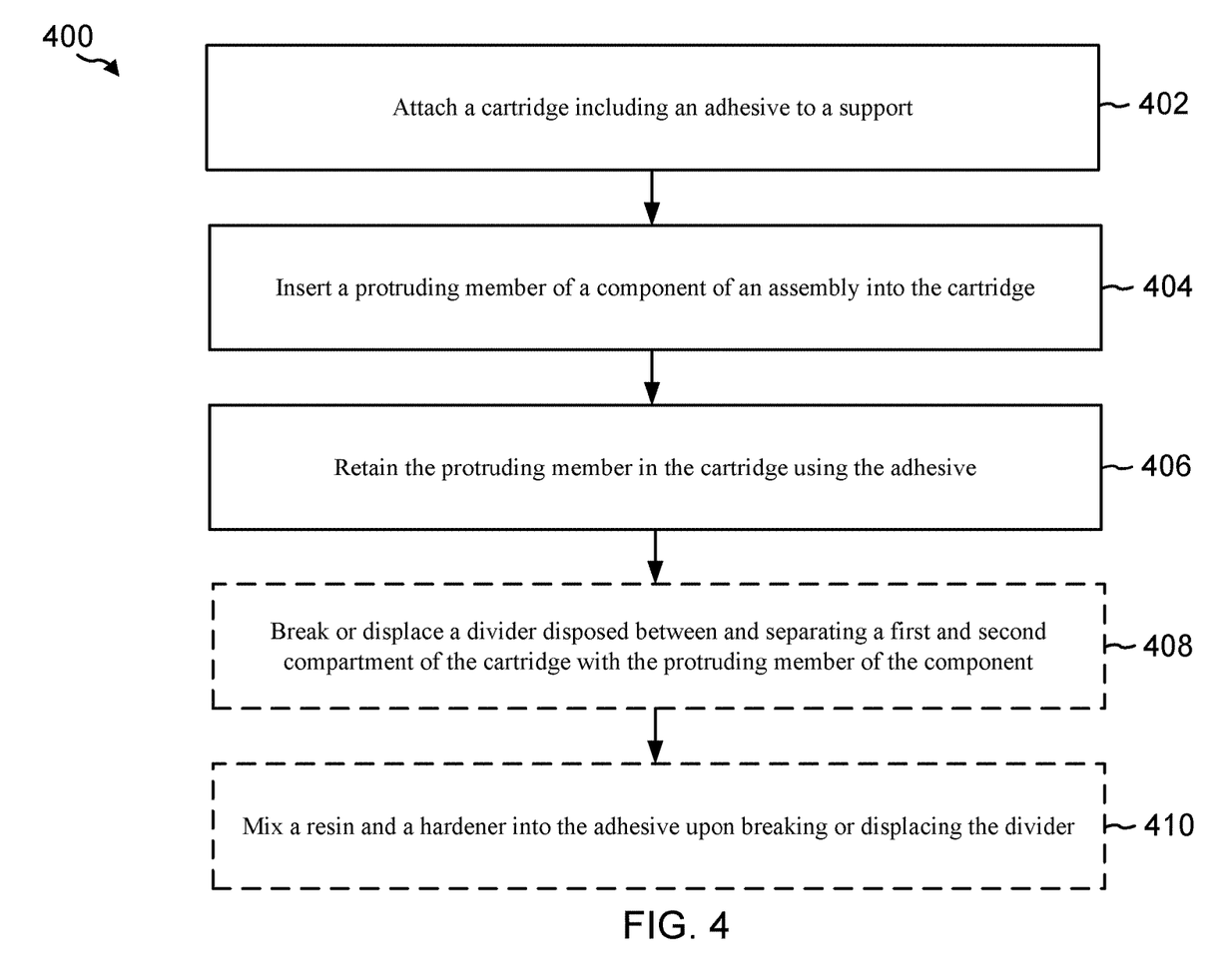
FIG. 4 is a flow diagram of an exemplary process for securing a component of an assembly to an assembly table.

FIG. 4 is a flow diagram illustrating a method 400 of securing a component of an assembly to a support. Component (e.g. component 252) may be a connecting element 104a, 104b, 104c, a node 106, a panel, extrusion or other AM, non-AM, or COTS part, a sub-assembly of parts, or plurality of sub-assemblies. Assembly (e.g. assembly 100) may be a frame 102 of a vehicle, for example a vehicle chassis or other structure. Support (e.g. support 200) may be an assembly table 202 or any other type of support for the assembly (e.g. a wall, platform, or the like). Optional aspects are illustrated in dashed lines. The method allows the component 252 to be securely retained in a selected position during production of assembly 100 to allow for strict tolerance, proper orientation, and precise fit between components of the assembly 100.

At 402, a cartridge is attached to the support. The cartridge may include a housing including at least one compartment, an adhesive disposed within the at least one compartment, a membrane lid enclosing an opening of the housing, and a fastener connected to the housing for removable attachment to the support. For example, as illustrated in FIGS. 2 and 3A-3C, a cartridge 250, 300 may be attached to assembly table 202. Each component 252 of the assembly 100 may have an integrally or separately attached protruding member 254 which is used to retain the component inside the cartridge 250. The cartridge includes a housing 302 including at least one compartment 304. An adhesive 310 is disposed within the compartment which adheres the protruding member to the cartridge. The housing 302 includes a membrane lid 316 enclosing an opening 317 of the housing. The membrane lid 316 receives the protruding member 254 from the component 252 such that the protruding member becomes adhered to the adhesive 310 upon penetrating the membrane lid. Each cartridge 250 may further include a fastener 253 (e.g. a screw, bolt, or any other removable, fastening) which may be removably attached to the assembly table 202.

At 404, a protruding member of the component is inserted into the cartridge. For example, referring to FIGS. 2 and 3A-3C, component 252 may include a protruding member 254 which is inserted into the cartridge 250, 300. The protruding member may penetrate the membrane lid 316 of the cartridge into the at least one compartment 304 containing adhesive 310.

At 406, the protruding member is retained in the cartridge using the adhesive. For example, referring to FIGS. 2 and 3A-3C, the protruding member 254 may be retained in cartridge 250, 300 using adhesive 310. Where the cartridge 250, 300 only includes one compartment 304, the protruding member may be retained upon contact with the adhesive 310. The cartridge may be removably attached to the assembly table 202 using fastener 253, thereby securely retaining the component to the support and constraining its movement in six degrees of freedom during assembly of the frame 102.

Where the cartridge 250, 300 includes two compartments 306, 308, including first compartment 306 and second compartment 308, the adhesive may be a two-part adhesive comprising a resin 312 and a hardener 314. A divider 320 may be disposed between and separating the first and second compartments, where one of the resin or hardener is disposed within the first compartment while the other is disposed within the second compartment.

At 408, the divider may be broken or displaced with the protruding member of the component, and at 410, the resin and the hardener may be mixed into adhesive upon breaking or displacing the divider in order to retain the protruding member in the cartridge. For example, referring to FIG. 3B, the divider 320 may include a thin sheathing 324 which the protruding member 254 may break to cause mixing of the resin 312 and the hardener 314 into adhesive 310. The resin 312 and hardener 314 may mix in response to some agitation caused by the breaking of the divider. Alternatively, the divider 320 may include a plurality of orifices 326 through which the resin or hardener may flow and mix into adhesive 310 upon displacement of the divider by the protruding member. The component 252 may subsequently be retained to the cartridge by the formed adhesive 310.

Thus, aspects of the present disclosure advantageously allow components of an assembly to be quickly retained in any selected position during manufacture of the assembly through use of a cartridge which constrains movement of the component along six degrees of freedom. Components may thus maintain their position, alignment, and/or fit during connection and/or assembly without the need for numerous vises, clamps, or other expensive retention mechanisms, accommodating the strict tolerance between the various components of the assembly. Moreover, the design of these cartridges (which may also be small, disposable AM parts) allows them to be strategically and independently placed to securely hold numerous components of the assembly (e.g. in the order of tens or hundreds or even thousands of cartridges per assembly), while also being flexible, self-contained, and cost-effective retention mechanisms for various components of the assembly.

The previous description is provided to enable any person skilled in the art to practice the various aspects described herein. Various modifications to the exemplary embodiments presented throughout this disclosure will be readily apparent to those skilled in the art, and the concepts disclosed herein may be applied to other objects besides vehicles. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A cartridge for securing a component of an assembly to a support, the cartridge comprising:
   a housing including a first compartment and a second compartment;
   a two-part adhesive comprising a resin and a hardener, the resin disposed within the first compartment and the hardener disposed within the second compartment;
   a fastener connected to the housing and removably attached to the support; and
   a membrane lid enclosing an opening of the housing and configured to receive a protruding member from the component such that the protruding member becomes adhered to the two-part adhesive upon penetrating the membrane lid.

2. The cartridge of claim 1, wherein the cartridge includes, for mixing the resin and the hardener, one of:
compressed air within the resin or the hardener,
a loaded mechanical spring in the first compartment or the second compartment, or
a pressure differential between the first compartment and the second compartment.

3. The cartridge of claim 1, wherein the assembly is within a vertical assembly cell.

4. The cartridge of claim 1, wherein the two-part adhesive comprises a low-viscosity, quick set adhesive.

5. The cartridge of claim 1, further comprising a divider disposed between and separating the first compartment and the second compartment, the divider forming a seal against the housing.

6. The cartridge of claim 5, wherein the divider comprises a film sheathing, and wherein the resin and the hardener are configured to mix upon breakage of the film sheathing by the protruding member of the component.

7. The cartridge of claim 5, wherein the divider includes a plurality of orifices, and wherein the resin and the hardener are configured to mix through the plurality of orifices upon displacement of the divider by the protruding member of the component.

8. The cartridge of claim 5, wherein the divider is pressurized to allow the resin and the hardener to volatilely mix upon breakage of the divider.

9. The cartridge of claim 5, further comprising at least one divider guide disposed within the first compartment or the second compartment for holding the divider in place within the housing.

10. The cartridge of claim 1, wherein the component is constrained in movement along six degrees of freedom when inserted into the first compartment or the second compartment.

11. The cartridge of claim 1, wherein the protruding member includes saw-tooth edges configured to grip and form a seal against the membrane lid.

12. A vehicle chassis assembly comprising:
a chassis comprising a plurality of components, each component including a protruding member; and
a plurality of cartridges for individually securing each component to a support, each cartridge comprising:
a housing including at least one compartment;
an adhesive within the at least one compartment;
a fastener connected to the housing and removably attached to the support; and
a membrane lid enclosing an opening of the housing and configured to receive a protruding member from the component such that the protruding member becomes adhered to the adhesive upon penetrating the membrane lid.

13. The vehicle chassis assembly of claim 12, wherein the chassis is within a vertical assembly cell.

14. The vehicle chassis assembly of claim 12, wherein the at least one compartment comprises a first compartment and a second compartment, wherein the adhesive is a two-part adhesive comprising a resin and a hardener, and wherein the resin is disposed within the first compartment and the hardener is disposed within the second compartment.

15. The vehicle chassis assembly of claim 14, further comprising a divider disposed between and separating the first compartment and the second compartment, the divider forming a seal against the housing.

16. The vehicle chassis assembly of claim 15, wherein the divider comprises a film sheathing, and wherein the resin and the hardener are configured to mix upon breakage of the film sheathing by the protruding member of the component.

17. The vehicle chassis assembly of claim 15, wherein the divider includes a plurality of orifices, and wherein the resin and the hardener are configured to mix through the plurality of orifices upon displacement of the divider by the protruding member of the component.

18. A cartridge for securing a component of an assembly to a support, the cartridge comprising:
a housing including at least one compartment;
an adhesive within the at least one compartment;
a fastener connected to the housing and removably attached to the support; and
a membrane lid enclosing an opening of the housing and configured to receive a protruding member from the component such that the protruding member becomes adhered to the adhesive upon penetrating the membrane lid, the protruding member including saw-tooth edges configured to grip and form a seal against the membrane lid.

19. The cartridge of claim 18, wherein the cartridge includes, for curing the adhesive within a predetermined time, at least one of:
inductive heating coils disposed around the at least one compartment, or
conductive metal placed inside the adhesive.

20. The cartridge of claim 18, wherein the assembly is within a vertical assembly cell.

21. The cartridge of claim 18, wherein the adhesive comprises a low-viscosity, quick set adhesive.

22. The cartridge of claim 18, wherein the at least one compartment comprises a first compartment and a second compartment, wherein the adhesive is a two-part adhesive comprising a resin and a hardener, and wherein the resin is disposed within the first compartment and the hardener is disposed within the second compartment.

23. The cartridge of claim 18, wherein the component is constrained in movement along six degrees of freedom when inserted into the at least one compartment.

* * * * *